United States Patent
Ohkado

(10) Patent No.: US 9,460,295 B2
(45) Date of Patent: Oct. 4, 2016

(54) DELETING INFORMATION TO MAINTAIN SECURITY LEVEL

(75) Inventor: Akira Ohkado, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 14/351,553

(22) PCT Filed: Aug. 1, 2012

(86) PCT No.: PCT/JP2012/069633
§ 371 (c)(1),
(2), (4) Date: Jun. 16, 2014

(87) PCT Pub. No.: WO2013/054584
PCT Pub. Date: Apr. 18, 2013

(65) Prior Publication Data
US 2014/0304840 A1    Oct. 9, 2014

(30) Foreign Application Priority Data
Oct. 12, 2011 (JP) .................................. 2011-225285

(51) Int. Cl.
*G06F 21/60* (2013.01)
*G06F 21/62* (2013.01)

(52) U.S. Cl.
CPC ............. *G06F 21/60* (2013.01); *G06F 21/606* (2013.01); *G06F 21/6209* (2013.01); *G06F 2221/2143* (2013.01)

(58) Field of Classification Search
CPC .. G06F 21/60; G06F 21/606; G06F 21/6209; G06F 2221/2143
See application file for complete search history.

(56) References Cited

U.S. PATENT DOCUMENTS

| 5,835,601 A | 11/1998 | Shimbo et al. |
| 6,826,626 B1 * | 11/2004 | McManus ......... G06F 17/30902 707/999.101 |

(Continued)

FOREIGN PATENT DOCUMENTS

| CN | 1439134 A | 8/2003 |
| CN | 1904847 A | 1/2007 |

(Continued)

OTHER PUBLICATIONS

International Application No. PCT/JP2012069633, International Search Report, dated Sep. 4, 2012, 2 pages.

(Continued)

*Primary Examiner* — Hadi Armouche
*Assistant Examiner* — Sher A Khan
(74) *Attorney, Agent, or Firm* — Stosch Sabo; Gail H. Zarick

(57) ABSTRACT

A method, system, mediation server, client, and computer program for deleting a copied file in which a master file is duplicated while maintaining a certain level of security. A mediation server receives and stores a copied file in which a master file stored in a server is duplicated, generates private-key information and public-key information, and transmits the generated public-key information and the copied file to a client. The client receives and stores the copied file and the public-key information. In a case where the copied file is updated, the client encrypts difference information on the difference arising in the updating using the public-key information and transmits the difference information to the mediation server. The client determines whether the condition for being secure is satisfied when a process for updating the copied file becomes possible. When determining that the condition is not satisfied, the client deletes the copied file.

6 Claims, 10 Drawing Sheets

(56) References Cited

U.S. PATENT DOCUMENTS

| | | | |
|---|---|---|---|
| 2002/0147849 A1* | 10/2002 | Wong | G06F 17/3089 709/246 |
| 2002/0194491 A1* | 12/2002 | Natanzon | H04L 63/0414 726/1 |
| 2004/0054779 A1* | 3/2004 | Takeshima | G06F 17/30569 709/225 |
| 2005/0010607 A1 | 1/2005 | Parker et al. | |
| 2007/0100913 A1* | 5/2007 | Sumner | G06F 11/1453 |
| 2007/0180239 A1* | 8/2007 | Fujibayashi | G06F 11/1076 713/165 |
| 2008/0229302 A1* | 9/2008 | Kufeldt | G06F 21/10 717/173 |
| 2009/0055924 A1* | 2/2009 | Trotter | G06F 21/6245 726/20 |
| 2009/0171978 A1* | 7/2009 | Naono | G06F 17/30578 |
| 2009/0228532 A1* | 9/2009 | Anzai | G06F 17/30079 |
| 2009/0249005 A1* | 10/2009 | Bender | G06F 11/1435 711/162 |
| 2011/0106755 A1* | 5/2011 | Hao | G06F 11/1451 707/610 |
| 2012/0229256 A1* | 9/2012 | Morse | H04M 1/72572 340/8.1 |

FOREIGN PATENT DOCUMENTS

| | | |
|---|---|---|
| CN | 101589386 A | 11/2009 |
| JP | H0659956 A | 3/1994 |
| JP | 07253894 A | 10/1995 |
| JP | H08106412 A | 4/1996 |
| JP | 2001273279 A | 10/2001 |
| JP | 2004227198 A | 8/2004 |
| JP | 2004355162 A | 12/2004 |
| JP | 2005209181 A | 8/2005 |
| JP | 2006252312 A | 9/2006 |
| JP | 2007531071 A | 11/2007 |
| JP | 2008003847 A | 1/2008 |
| JP | 200993508 A | 4/2009 |
| JP | 2009181545 A | 8/2009 |
| JP | 2010044562 A | 2/2010 |
| JP | 2010231658 A | 10/2010 |
| JP | 2010266933 A | 11/2010 |
| WO | WO 02088983 A1 * 11/2002 | ....... G06F 17/30902 |

OTHER PUBLICATIONS

International Application No. PCT/JP2012069633, Written Opinion of the International Searching Authority, dated Sep. 4, 2012, 4 pages.

* cited by examiner

FIG. 6
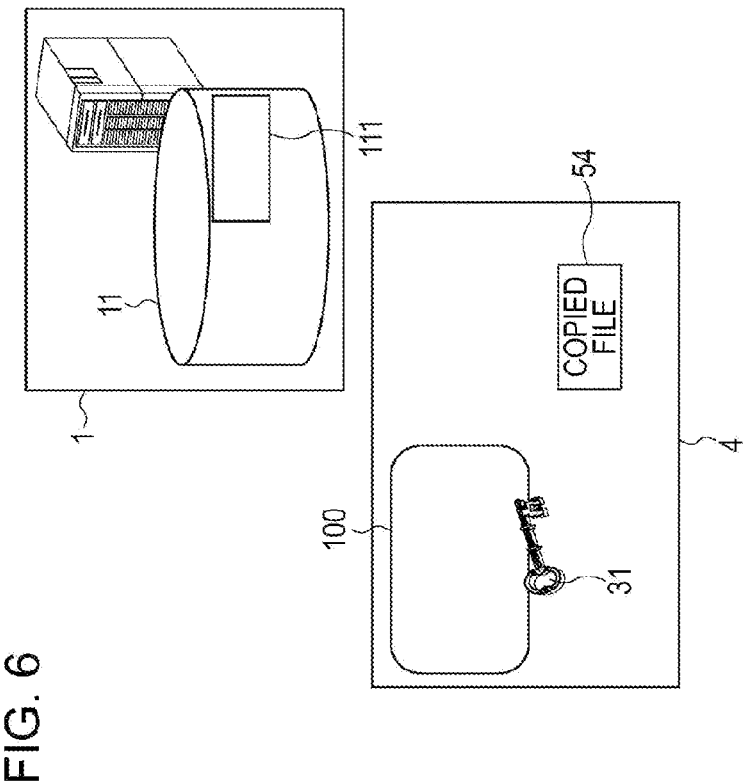
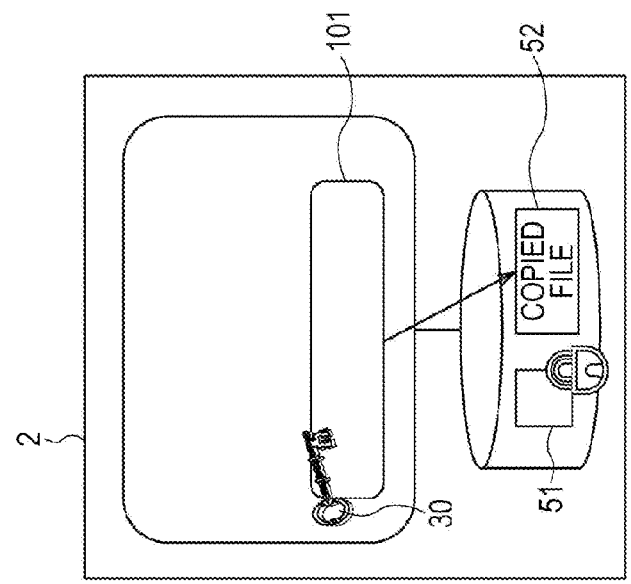

DELETING INFORMATION TO MAINTAIN SECURITY LEVEL

This application is a continuation of and claims priority under 35 U.S.C. §371 to International Application No. PCT/JP2012/069633 filed on Aug. 1, 2012, which claims priority to JP 2011-225285 filed on Oct. 12, 2011. The contents of both aforementioned applications are incorporated herein by reference.

TECHNICAL FIELD

The present invention relates to a method, system, mediation server, client, and computer program for deleting information while maintaining a certain level of security without sacrificing user convenience.

BACKGROUND ART

Methods of encrypting and using information to protect classified information are widely available. Typically, information is encrypted or decrypted using an encryption key. For example, Patent Literature 1 discloses a system for managing document use. In this system, when an electronic document stored in a document management server is edited at a client terminal, only difference data is transmitted to the document management server to update the document. Patent Literature 2 discloses a collaborative file update system for encrypting a difference file and transmitting it to an access server.

The system in Patent Literature 2 retains security by encrypting a difference file using an encryption key. Typically, an encryption key is protected with a login password in most cases. In such cases, if the password is leaked, guessed, or the like, the encryption key can be retrieved even when any strong encryption has been performed. Thus, downloading classified information is allowed on the condition that data communication with a time limit or at established intervals is carried out with a server; if the condition is not met, the classified information is automatically deleted.

For example, Patent Literature 3 discloses a content management system for deleting a duplicate copied file when a deletion request is received from a client side or when the availability period of the copied file of the duplicated content has expired.

CITATION LIST

Patent Literature

PTL 1: Japanese Unexamined Patent Application Publication No. 2008-003847
PTL 2: Japanese Unexamined Patent Application Publication (Translation of PCT Application) No. 2007-531071
PTL 3: Japanese Unexamined Patent Application Publication No. 2006-252312

SUMMARY

Technical Problem

Even if an encryption key is read, deletion of a duplicate copied file can prevent the possibility of leakage of classified information. However, there is an issue in that if the condition for deleting the duplicate copied file is loose, then the loss, theft, or the like of classified information may be undetectable; if the condition is strict, even with an authorized user, the condition may not be satisfied and thus the classified information may be deleted, depending on the surrounding environment, such as the status of radio waves or the remaining battery power.

In light of such circumstances, it is an object of the present invention to provide a method, system, mediation server, client, and computer program for deleting a copied file in which a master file is duplicated while maintaining a certain level of security.

Solution to Problem

A method according to a first aspect of the invention to achieve the above object is executable in a system including a server, a client, and a mediation server. The server stores a master file. The client is connected to the server so as to be able to perform data communication therewith. The mediation server is connected to the server and the client so as to be able to perform data communication therewith. The system updates a file using a copied file in which the master file is duplicated. The mediation server receives and stores the copied file in which the master file stored in the server is duplicated and generates private-key information and public-key information associated with the private-key information and transmits the generated public-key information and the copied file to the client. The client receives and stores the copied file and the public-key information. In a case where the copied file is updated, the client encrypts difference information on a difference arising in the updating using the public-key information and transmits the difference information to the mediation server. The client determines whether a condition for being secure is satisfied when a process for updating the copied file becomes possible and deletes the copied file when it is determined that the condition is not satisfied.

For a method according to a second aspect of the invention, in the first aspect, the condition may be information on a physical location where the client is used.

For a method according to a third aspect of the invention, in the first aspect, the client may measure a time elapsed since receipt of the public-key information and the copied file from the mediation server and determine whether the condition is satisfied using a time elapsed since a predetermined point in time.

For a method according to a fourth aspect of the invention, in any one of the first to third aspects of the invention, in a case where a check-in request for the copied file is accepted, the client may delete the public-key information and the copied file, and in a case where the check-in request for the copied file is accepted from the client, the mediation server may replace the master file in the server with the stored copied file and delete the public-key information, the private-key information associated with the public-key information, and the copied file.

A system according to a fifth aspect of the invention to achieve the above object includes a server storing a master file, a client connected to the server so as to be able to perform data communication therewith, and a mediation server connected to the server and the client so as to be able to perform data communication therewith. The system updates a file using a copied file in which the master file is duplicated. The mediation server includes copied-file acquiring means for acquiring and storing the copied file in which the master file stored in the server is duplicated and transmitting means for generating private-key information and public-key information associated with the private-key information and transmitting the generated public-key information and the copied file to the client. The client includes receiving means for receiving and storing the copied file and the public-key information, difference-information transmitting means for, in a case where the copied file is updated, encrypting difference information on a difference arising in the updating using the public-key information and transmitting the difference information to the mediation server, condition determining means for determining whether a condition for being secure is satisfied when a process for updating the copied file becomes possible, and copied-file deleting means for deleting the copied file when it is determined that the condition is not satisfied.

For a system according to a sixth aspect of the invention, in the fifth aspect, the condition may be information on a physical location where the client is used.

For a system according to a seventh aspect of the invention, in the fifth aspect, the client may further include time measuring means for measuring a time elapsed since receipt of the public-key information and the copied file from the mediation server, and the condition determining means may determine whether the condition is satisfied using a time elapsed since a predetermined point in time.

For a system according to an eighth aspect of the invention, in any one of the fifth to seventh aspects of the invention, the client may further include deleting means for, in a case where a check-in request for the copied file is accepted, deleting the public-key information and the copied file, and the mediation server may further include key-information/copied-file deleting means for, in a case where the check-in request for the copied file is accepted from the client, replacing the master file in the server with the stored copied file and deleting the public-key information, the private-key information associated with the public-key information, and the copied file.

A mediation server according to a ninth aspect of the invention to achieve the above object is connected to a server and a client so as to be able to perform data communication therewith. The server stores a master file. The client is connected to the server so as to be able to perform data communication therewith. The mediation server includes copied-file acquiring means for acquiring and storing the copied file in which the master file stored in the server is duplicated, transmitting means for generating private-key information and public-key information associated with the private-key information and transmitting the generated public-key information and the copied file to the client, and key-information/copied-file deleting means for, in a case where the check-in request for the copied file is accepted from the client, replacing the master file in the server with the stored copied file and deleting the public-key information, the private-key information associated with the public-key information, and the copied file.

A computer program according to a 10th aspect of the invention to achieve the above object is executable in a mediation server. The mediation server is connected to a server and a client so as to be able to perform data communication therewith. The server stores a master file. The client is connected to the server so as to be able to perform data communication therewith. The computer program causes the mediation server to function as copied-file acquiring means for acquiring and storing the copied file in which the master file is duplicated, transmitting means for generating private-key information and public-key information associated with the private-key information and transmitting the generated public-key information and the copied file to the client, and key-information/copied-file deleting means for, in a case where the check-in request for the copied file is accepted from the client, replacing the master file in the server with the stored copied file and deleting the public-key information, the private-key information associated with the public-key information, and the copied file.

A client according to an 11th aspect of the invention to achieve the above object is connected to a server and a mediation server so as to be able to perform data communication therewith. The server stores a master file. The mediation server stores a copied file in which the mediation server stored in the server is duplicated. The client includes receiving means for receiving and storing the copied file and the public-key information, difference-information transmitting means for, in a case where the copied file is updated, encrypting difference information on a difference arising in the updating using the public-key information and transmitting the difference information to the mediation server, condition determining means for determining whether a condition for being secure is satisfied when a process for updating the copied file becomes possible, and copied-file deleting means for deleting the copied file when it is determined that the condition is not satisfied.

For a client according to a 12th aspect of the invention, in the 11th aspect of the invention, the condition may be information on a physical location where the client is used.

For a client according to a 13th aspect of the invention, in the 11th aspect of the invention, the client may further include time measuring means for measuring a time elapsed since receipt of the public-key information and the copied file from the mediation server, and the condition determining means may determine whether the condition is satisfied using a time elapsed since a predetermined point in time.

For a client according to a 14th aspect of the invention, in any one of the 11th to 13th aspects of the invention, the client may further include deleting means for, in a case where a check-in request for the copied file is accepted, deleting the public-key information and the copied file.

A computer program according to a 15th aspect of the invention to achieve the above object is executable in a client. The client is connected to a server and a mediation server so as to be able to perform data communication therewith. The server stores a master file. The mediation server stores a copied file in which the master file stored in the server is duplicated. The computer program causes the client to function as receiving means for receiving and storing the copied file and the public-key information, difference-information transmitting means for, in a case where the copied file is updated, encrypting difference information on a difference arising in the updating using the public-key information and transmitting the difference information to the mediation server, condition determining means for determining whether a condition for being secure is satisfied when a process for updating the copied file becomes possible, and copied-file deleting means for deleting the copied file when it is determined that the condition is not satisfied.

Advantages

According to the present invention, an updating process is performed on a copied file stored in the mediation server, and encryption-key information for use in encrypting and decrypting difference information is also generated in the mediation server. Therefore, if a client that performs the updating process is missing, stolen, or the like, the master file in the server can be prevented from being directly tampered with or the like. When the condition for being secure is not satisfied, such as when no access to a copied file has been made for a certain length of time or when a certain length of time has elapsed since disconnection from the network, the copied file can be deleted with reliability, and the security of the master file containing classified information can be maintained at a high level.

BRIEF DESCRIPTION OF DRAWINGS

FIG. 6 is a schematic diagram that illustrates a process occurring when the client in the file updating system according to the embodiment of the present invention is stolen.

DESCRIPTION

A system for deleting information while maintaining a certain level of security without sacrificing user convenience according to an embodiment of the present invention is specifically described below on the basis of the drawings. The embodiment described below does not intend to limit the invention described in the claims, and it is needless to say that not all of the combinations of the features described in the embodiment are required for the solving means. In the present specification, "check-out" indicates retrieving a writable copy of the master file that is a target for updating, and "check-in" indicates updating a master file with an updated content.

The present invention can be embodied in many different forms and should not be construed as limited to the content described in the embodiment. In the embodiment, the same number refers to the same element.

An apparatus that installs a computer program in a computer system is described in the embodiment below. As is apparent to those skilled in the art, the present invention can be achieved in part as a computer program executable by a computer. Accordingly, the present invention can take an embodiment as hardware of a system for deleting information while maintaining a certain level of security without sacrificing user convenience, an embodiment as software, or an embodiment as a combination of software and hardware. The computer program can be recorded in a recording medium readable by any computer, such as a hard disk, a digital versatile disc (DVD), a compact disk (CD), an optical storage device, and a magnetic storage device.

According to the embodiment of the present invention, an updating process is performed on a copied file stored in the mediation server, and encryption-key information for use in encrypting and decrypting difference information is also generated in the mediation server. Therefore, if a client that performs the updating process is missing, stolen, or the like, the master file in the server can be prevented from being directly tampered with or the like. When the condition for being secure is not satisfied, such as when no access to a copied file has been made for a certain length of time or when a certain length of time has elapsed since disconnection from the network, the copied file can be deleted with reliability, and the security of the master file containing classified information can be maintained at a high level.

Figure 1:
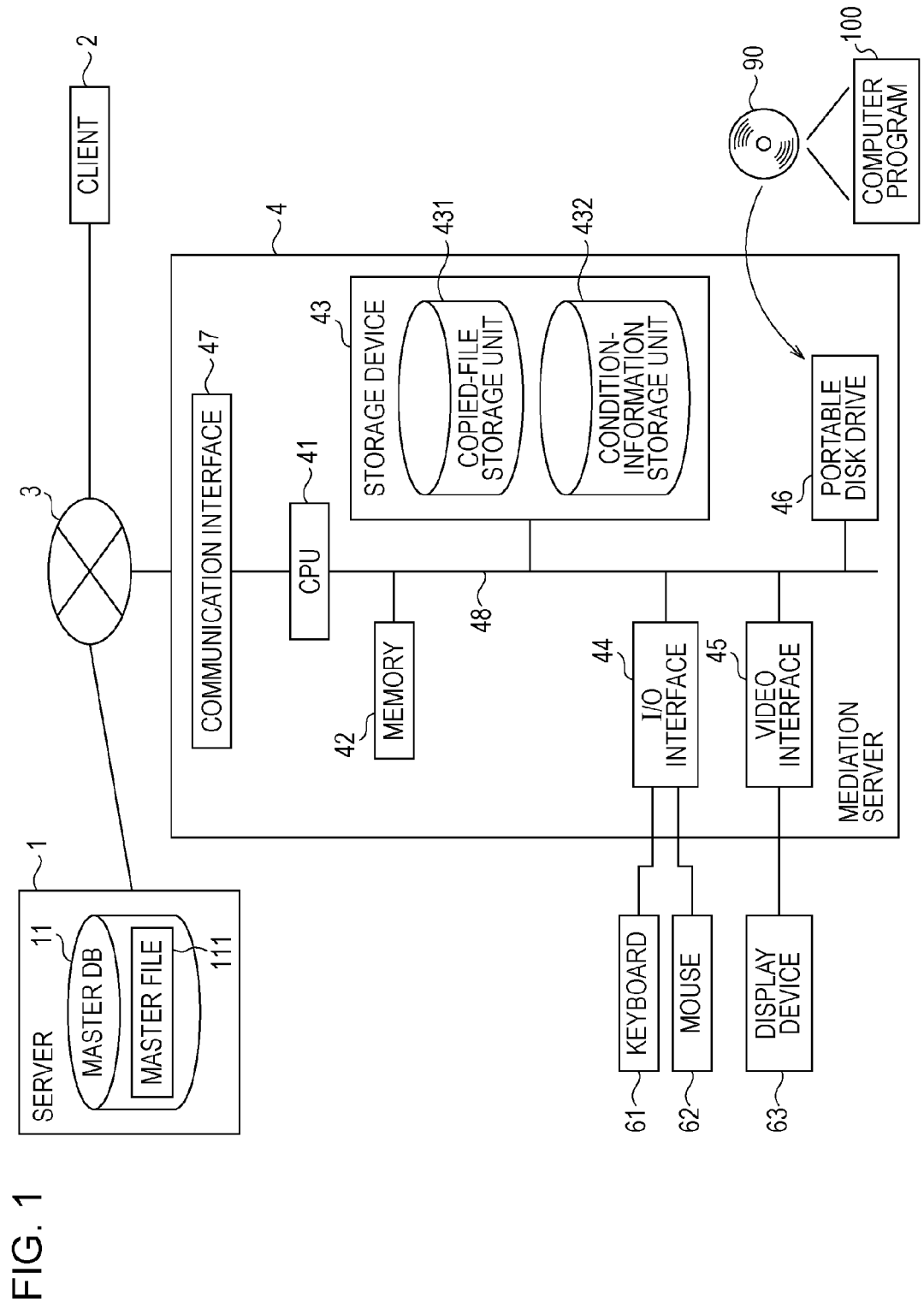
FIG. 1 is a block diagram that schematically illustrates the configuration of a file updating system according to an embodiment of the present invention.

FIG. 1 is a block diagram that schematically illustrates the configuration of a file updating system according to the embodiment of the present invention. In the file updating system according to the present embodiment, a server 1 that stores a master file that is a target for updating and a client 2 that updates a file are connected to each other so as to be able to perform data communication with each other over a network 3. In addition to it, a mediation server 4 is connected to the server 1 and the client 2 over the network 3 so as to be able to perform data communication therewith.

The mediation server 4 includes at least a central processing unit (CPU) 41, a memory 42, a storage device 43, an I/O interface 44, a video interface 45, a portable disk drive 46, a communication interface 47, and an internal bus 48 connecting the pieces of hardware described above.

The CPU 41 is connected to the pieces of hardware described above in the mediation server 4 through the internal bus 48, controls the operations of the pieces of hardware described above, and carries out various software functions in accordance with a computer program 100 stored in the storage device 43. The memory 42 includes a volatile memory, such as a static random access memory (SRAM) or a synchronous dynamic random access memory (SDRAM). In execution of the computer program 100, a load module is loaded into the memory 42, and the memory 42 stores temporary data and the like occurring in the execution of the computer program 100.

The storage device 43 includes an internal fixed storage (hard disk), a read-only memory (ROM), or the like. The computer program 100 stored in the storage device 43 is the one downloaded by the portable disk drive 46 from a portable recording medium 90, such as a DVD or a CD-ROM, on which information, such as a program and data, is recorded. The computer program 100 is loaded from the storage device 43 into the memory 42 and executed. The computer program 100 may be a computer program downloaded from an external computer connected via the communication interface 47.

The storage device 43 includes a copied-file storage unit 431 that stores a copied file in which the master file in the server 1 is duplicated and a condition-information storage unit 432 that stores condition information on a condition for being secure when an updating process becomes possible. The copied file is stored in the copied-file storage unit 431 at the time of check-out requesting for the master file and is deleted from the copied-file storage unit 431 at the time of check-in requesting. Private-key information and public-key information generated for each copied file are also stored.

Examples of the condition information on a condition for being secure stored in the condition-information storage unit 432 can include the time elapsed since the last disconnection of communication with the client 2, the time elapsed since receipt of a check-out request, and a range of the physical location (information on the location) of the client 2 based on a global positioning system (GPS) signal or the like. The condition information is transmitted to the client 2 at the time of transmission of the copied file.

The communication interface 47 is connected to the internal bus 48, and is connected to an external network, such as the Internet, a local area network (LAN), and a wide area network (WAN), and is thus allowed to transmit and receive data to and from an external computer and the like.

The I/O interface 44 is connected to an input device, such as a keyboard 61 and a mouse 62, and entered data is accepted therethrough. The video interface 45 is connected to a display device 63, such as a cathode-ray tube (CRT) display or a liquid crystal display, and a predetermined image is displayed thereon.

Figure 2:
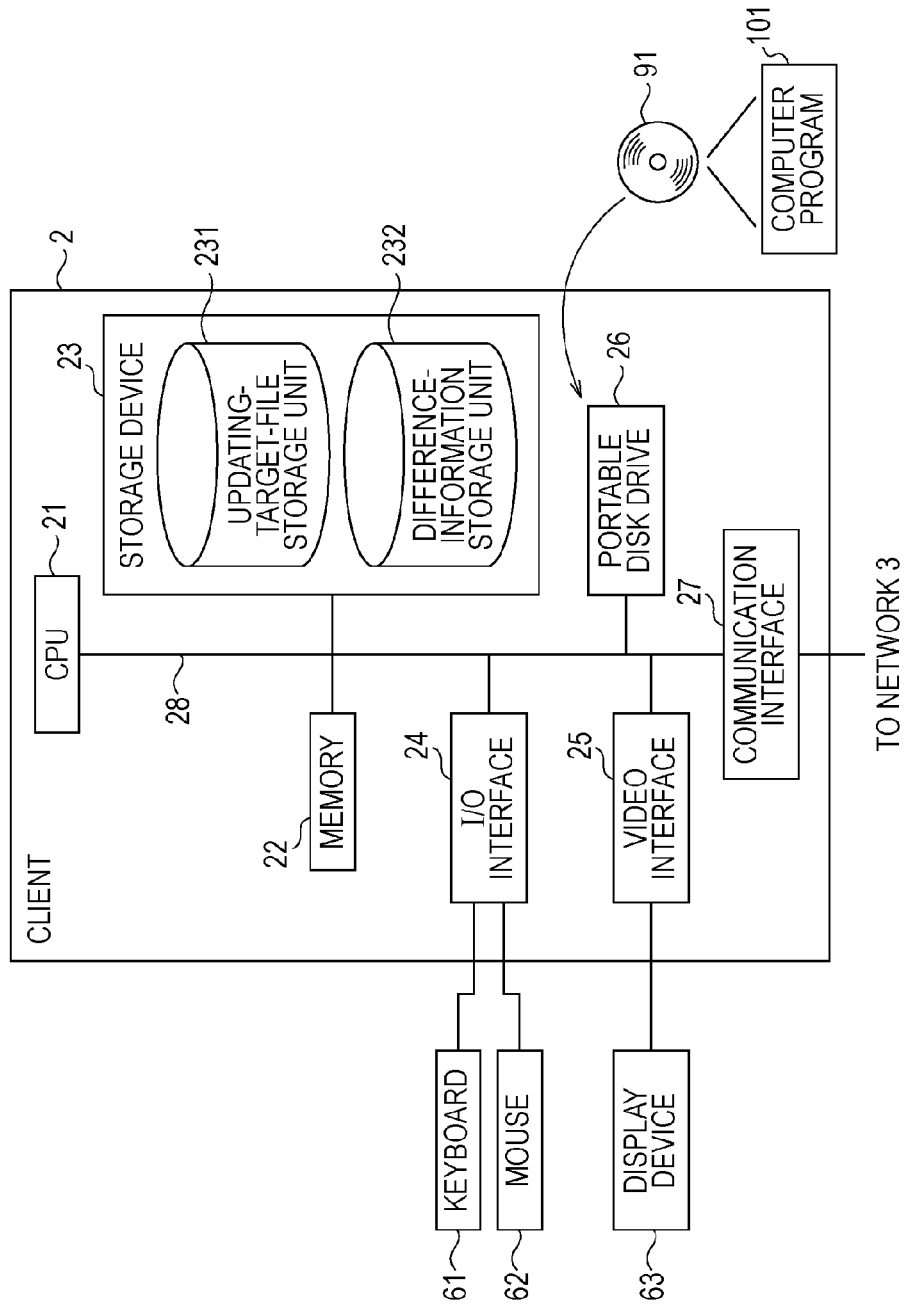
FIG. 2 is a block diagram that illustrates the configuration of a client according to the embodiment of the present invention.

FIG. 2 is a block diagram that illustrates the configuration of the client 2 according to the embodiment of the present invention. The client 2 according to the present embodiment includes, for example, a CPU 21, a memory 22, a storage device 23, an I/O interface 24, a video interface 25, a portable disk drive 26, a communication interface 27, and an internal bus 28 connecting the pieces of hardware described above. The portable disk drive 26 is optional.

The CPU 21 is connected to the pieces of hardware described above in the client 2 through the internal bus 28, controls the operations of the pieces of hardware described above, and carries out various software functions in accordance with a computer program 101 stored in the storage device 23. The memory 22 includes a volatile memory, such as an SRAM or an SDRAM. In execution of the computer program 101, a load module is loaded into the memory 22, and the memory 22 stores temporary data and the like occurring in the execution of the computer program 101.

The storage device 23 includes an internal fixed storage (hard disk), a ROM, or the like. The computer program 101 stored in the storage device 23 is the one downloaded by the portable disk drive 26 from a portable recording medium 91, such as a DVD or a CD-ROM, on which information, such as a program and data, is recorded. The computer program 101 is loaded from the storage device 23 into the memory 22 and executed. The computer program 101 may be a computer program downloaded from an external computer connected via the communication interface 27.

The storage device 23 includes an updating-target-file storage unit 231 that stores a copied file that is a target for updating and a difference-information storage unit 232 that stores difference information in the case where the copied file is updated. The copied file is received from the mediation server 4 and stored in the updating-target-file storage unit 231. The difference information is stored in the difference-information storage unit 232 as information on the difference arising in updating performed after the completion of the previous updating process. The updating-target-file storage unit 231 may preferably store the copied file being encrypted.

The communication interface 27 is connected to the internal bus 28, and is connected to an external network, such as the Internet, a LAN, and a WAN, and is thus allowed to transmit and receive data to and from an external computer and the like.

The I/O interface 24 is connected to an input device, such as a keyboard 61 and a mouse 62, and entered data is accepted therethrough. The video interface 25 is connected to a display device 63, such as a CRT display or a liquid crystal display, and a predetermined image is displayed thereon. The input device and the display device may be integrated as a touch-sensitive display.

Figure 3:
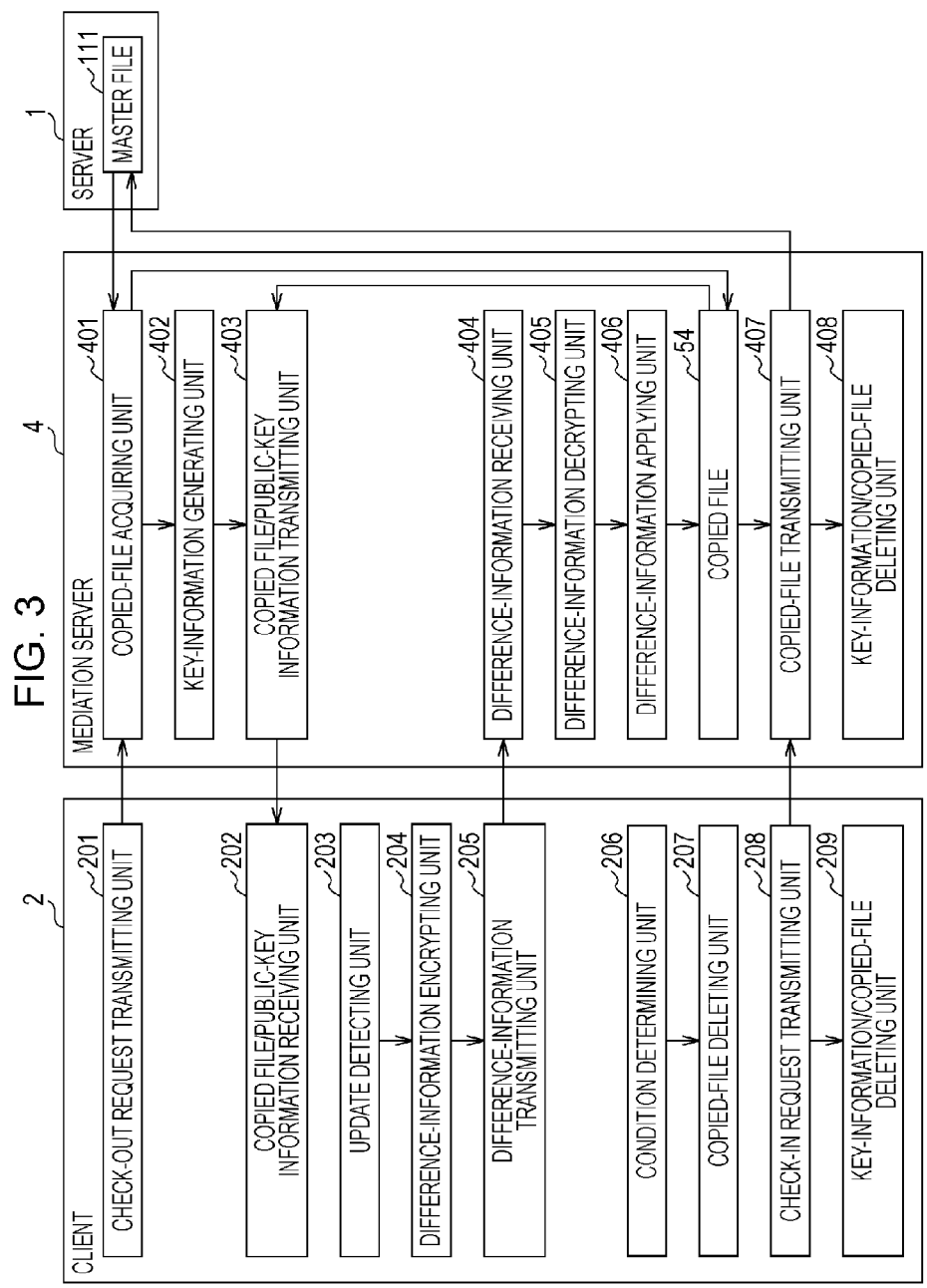
FIG. 3 is a functional block diagram of the file updating system according to the embodiment of the present invention.

FIG. 3 is a functional block diagram of the file updating system according to the embodiment of the present invention. A check-out request transmitting unit 201 in the client 2 transmits a check-out request accepted by the client 2 from a user through the keyboard 61, the mouse 62, or the like, to the mediation server 4. The check-out request contains information for use in authentication of the user who attempts to make check-out by the server 1, for example, a combination of the user ID and the password, and information for use in identifying the file being the target for updating, for example, a file name or the like.

All data communication between the client 2 and the mediation server 4 is performed in the state where the data is encrypted. Each of the client 2 and the mediation server 4 implements authentication to validate the authenticity of the communication partner before performing the data communication. The authenticating method may preferably use a certificate. This can eliminate an operation by a user of the client 2, such as inputting a user ID, when the client 2 attempts to start data communication with the mediation server 4 and enables the client 2 to automatically start the data communication without additional action of the user.

When receiving the check-out request from the client 2, a copied-file acquiring unit 401 in the mediation server 4 transmits the check-out request for an identified master file 111 to the server 1, receives and acquires from the server 1 a copied file in which the master file 111 being the identified file in a master DB 11 is duplicated, and stores the copied file in the copied-file storage unit 431 in the storage device 43. A key-information generating unit 402 generates private-key information and public-key information in association with the acquired copied file and stores them in the storage device 43 in association with information for identifying the copied file, for example, the file name. A copied file/public-key information transmitting unit 403 transmits the generated public-key information and the copied file to the client 2, which has transmitted the check-out request.

A copied file/public-key information receiving unit 202 in the client 2 receives the copied file and the public-key information from the mediation server 4 and stores them in the updating-target-file storage unit 231 in the storage device 23.

An update detecting unit 203 in the client 2 detects that the copied file stored in the updating-target-file storage unit 231 has been updated. When the update detecting unit 203 detects that the stored copied file has been updated, a difference-information encrypting unit 204 extracts difference information on the difference arising in the updating and encrypts the difference information using the public-key information. A difference-information transmitting unit 205 automatically attempts to communicate with the mediation server 4 as soon as the difference information is encrypted. As soon as the data communication becomes possible, the difference-information transmitting unit 205 transmits the encrypted difference information to the mediation server 4. Because the difference information is encrypted, if a malicious third party illegally acquires the difference information, that third party cannot read the updated content. In the preferred embodiment, the update detecting unit 203 has the functions to monitor a file operation on the operating system and to prohibit a copied file on the client 2 from being moved to a place other than the updating-target-file storage unit 231, being duplicated, and being saved with another name.

A difference-information receiving unit 404 in the mediation server 4 receives the encrypted difference information. A difference-information decrypting unit 405 decrypts the difference information using the stored private-key information. A difference-information applying unit 406 applies the decrypted difference information to a copied file 54 stored in the mediation server 4 to update the copied file 54 to the latest update state and prepare to update the master file 111 in the master DB 11 in the server 1. The latest copied file 54 stored in the mediation server 4 is not applied to the master file 111 in the server 1 until a check-in request is received from the client 2.

A condition determining unit 206 in the client 2 determines whether the condition for being secure is satisfied when a process for updating the copied file becomes possible. "When a process for updating the copied file becomes possible" indicates a broad concept that contains at the time of startup of the client 2 (including at the time of resuming from hibernation), at the time of unlocking a screen lock, and the like and that refers to at the time when any kind of operation can be made on the copied file.

The condition for being secure is not limited to, for example, a condition specified by the period of time, such as the time elapsed since the last data communication with the mediation server 4 or the time elapsed since transmission of a check-out request. Other examples of the condition for being secure may include a condition based on information sufficient for estimating an unauthorized access attempt, such as a situation where the clock incorporated in the client 2 indicates the time before the time of the last data communication with the mediation server 4 or a situation where the number of times of inputting of incorrect passwords exceeds a predetermined number of times, and a condition based on information on the location, such as a physical location range of the client 2 detected using a GPS signal or the like or a physical location range of the client 2 estimated on the basis of information from the nearest base station in a wireless LAN.

When the condition determining unit 206 determines that the condition for being secure is not satisfied when a process for updating the copied file becomes possible, a copied-file deleting unit 207 in the client 2 deletes the copied file stored in the updating-target-file storage unit 231 in the client 2 in a method that disables restoring of the copied file. An example of the method disabling restoring of the copied file can be a method of storing the copied file being encrypted by common key cryptography and erasing encrypted key information. Because the copied file is deleted, if difference information that has not yet been transmitted to the mediation server 4 remains, the copied file cannot be restored.

A check-in request transmitting unit 208 in the client 2 accepts a check-in request to update the master file 111 in the server 1 with the latest updated copied file. The check-in request typically contains information for use in authentication of a user who attempts to make check-in by the server 1, for example, a combination of a user ID and a password, or alternatively, if a user has made check-out on a plurality of files, contains information for use in identifying a file for check-in, for example, a file name or the like. A key-information/copied-file deleting unit 209 deletes the public-key information and the stored copied file.

When receiving the check-in request from the client 2, a copied-file transmitting unit 407 in the mediation server 4 duplicates the copied file 54 stored at that time and transmits it as the updated file to the server 1 to update the master file 111. A key-information/copied-file deleting unit 408 deletes the public-key information, private-key information associated with that public-key information, and the copied file 54.

Figure 4:
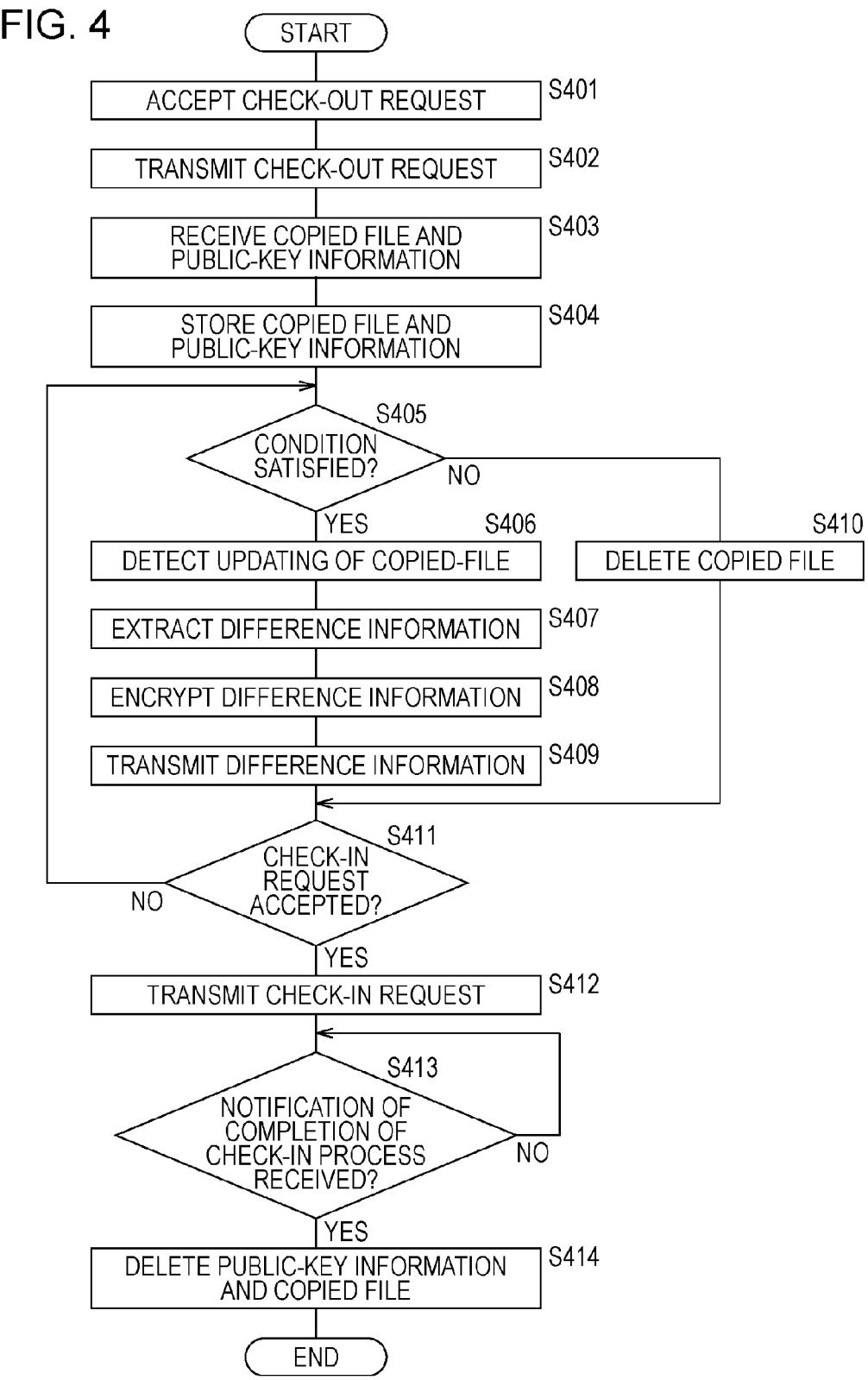
FIG. 4 is a flowchart that illustrates a procedure performed by a central processing unit (CPU) of the client in the file updating system according to the embodiment of the present invention.

FIG. 4 is a flowchart that illustrates a procedure performed by the CPU 21 of the client 2 in the file updating system according to the embodiment of the present invention. The CPU 21 of the client 2 accepts a check-out request (step S401) and transmits the accepted check-out request to the mediation server 4 (step S402). The check-out request contains information for use in identifying a file that is the target for updating, for example, a file name or the like.

The CPU 21 receives a copied file corresponding to the transmitted check-out request and public-key information for use in encrypting difference information from the mediation server 4 (step S403) and stores them in the updating-target-file storage unit 231 of the storage device 23 (step S404).

The CPU 21 determines whether the condition for being secure is satisfied when a process for updating the copied file becomes possible (step S405). When determining that the condition for being secure is satisfied (YES in step S405), the CPU 21 detects updating of the stored copied file (step S406) and extracts the difference information on the difference arising in the updating (step S407). To extract the difference between the stored copied file and the updated copied file after the completion of the updating process as the difference information, a duplication of the copied file before the updating is stored and that duplication is compared with the copied file after the updating. The CPU 21 encrypts the extracted difference information using the public-key information (step S408) and transmits the encrypted difference information to the mediation server 4 (step S409).

Figure 5:
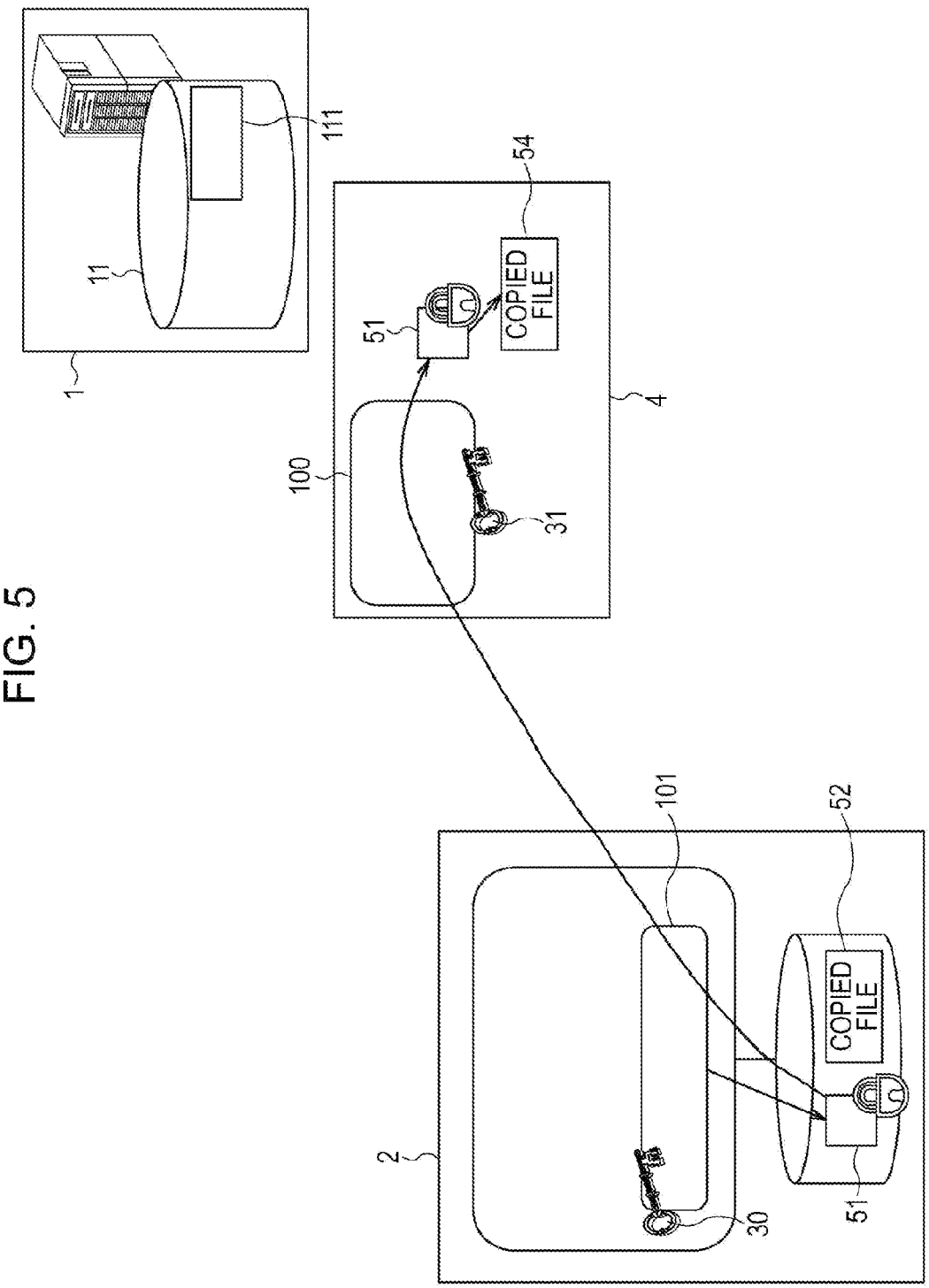
FIG. 5 is a schematic diagram that illustrates an updating process in the file updating system according to the embodiment of the present invention.

FIG. 5 is a schematic diagram that illustrates an updating process in the file updating system according to the embodiment of the present invention. As illustrated in FIG. 5, when detecting updating of a copied file 52, the CPU 21 extracts difference information 51 as the difference from the copied file before the updating and encrypts the difference information 51 using public-key information 30 using the computer program 101 running in the client 2.

The CPU 21 transmits the encrypted difference information to the mediation server 4. When receiving the difference information, the CPU 41 decrypts the difference information 51 using private-key information 31 and applies the decrypted difference information 51 to the stored copied file 54 to update it using the computer program 100 running in the mediation server 4. At this time, no difference information is applied to the master file 111.

Referring back to FIG. 4, when determining that the condition for being secure is not satisfied (NO in step S405), the CPU 21 of the client 2 deletes the stored copied file (step S410). In this case, the stored duplication of the copied file before the updating is also deleted in the above-described method disabling restoring of the file. Because the copied file is deleted, for example, if the client 2 is stolen and a malicious third party attempts to exploit information in the client 2, only the encrypted difference information that has not yet been transmitted to the mediation server 4 remains, the copied file cannot be restored, and because the private-key information is not present in the client 2, the difference information also cannot be decrypted.

FIG. 6 is a schematic diagram that illustrates a process occurring when the client in the file updating system according to the embodiment of the present invention is stolen. As illustrated in FIG. 6, the CPU 21 determines using the computer program 101 running in the client 2 whether the condition for being secure is satisfied. Specifically, for example, when a certain length of time has elapsed since the last access to the copied file, it is determined that the certain length of time is too long for temporary leaving during the updating process and it is determined that the device may have been stolen.

When the CPU 21 determines that the condition for being secure is not satisfied, because the n-th time difference information 51 and the copied file 52 having already been updated n times are stored in the client 2, the CPU 21 deletes the copied file 52, which has already been updated n times. Thus, the third party who has stolen the client 2 can read only the encrypted difference information 51. The client 2 has no private-key information for use in decrypting the difference information, and the third party cannot acquire means for restoring the difference information.

In that case, the n-th time difference information 51 is not applied to the copied file in the mediation server 4, and the mediation server 4 stores the copied file 54 to which the from first to (n−1)-th time difference information 51 is applied.

Referring back to FIG. 4, the CPU 21 of the client 2 determines whether a check-in request to update the master file with the updated copied file has been accepted (step S411). When determining that the check-in request has been accepted (YES in step S411), the CPU 21 transmits the check-in request to the mediation server 4 (step S412) and determines whether notification of the completion of the check-in process has been received (step S413).

When determining that the notification of the completion has not been received (NO in step S413), the CPU 21 waits for the notification of the completion. When determining that the notification of the completion has been received (YES in step S413), the CPU 21 deletes the public-key information and the stored copied file (step S414). When determining that the check-in request has not been accepted (NO in step S411), the CPU 21 returns the process to step S405 and the above-described steps are repeated.

Figure 7:
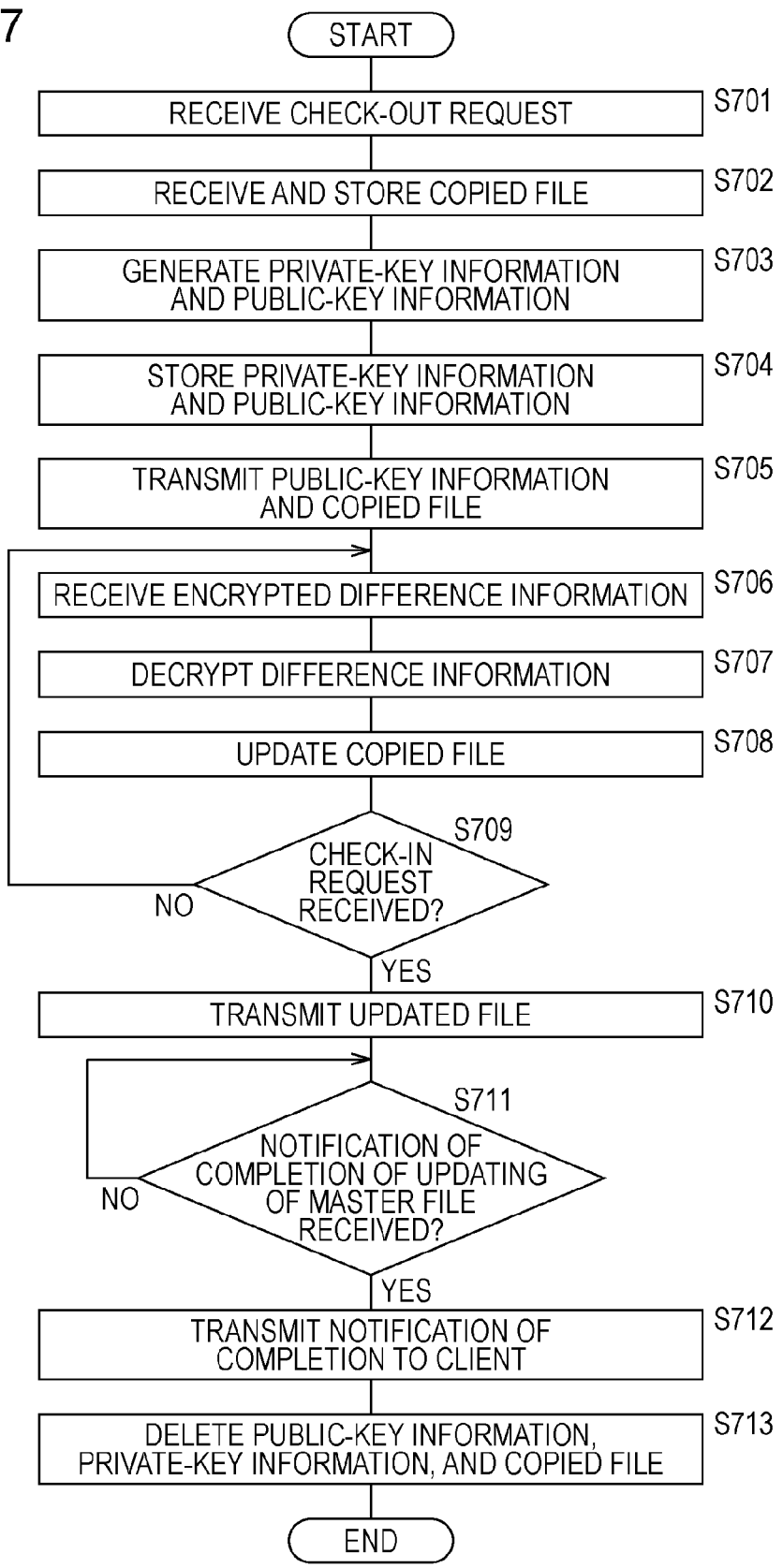
FIG. 7 is a flowchart that illustrates a procedure performed by a CPU of a mediation server in the file updating system according to the embodiment of the present invention.

FIG. 7 is a flowchart that illustrates a procedure performed by the CPU 41 of the mediation server 4 in the file updating system according to the embodiment of the present invention. The CPU 41 of the mediation server 4 receives a check-out request from the client 2 (step S701). The CPU 41 receives the copied file in which the master file 111 being the file identified by the check-out request is duplicated from the server 1 and stores it in the copied-file storage unit 431 in the storage device 43 (step S702).

Figure 8:
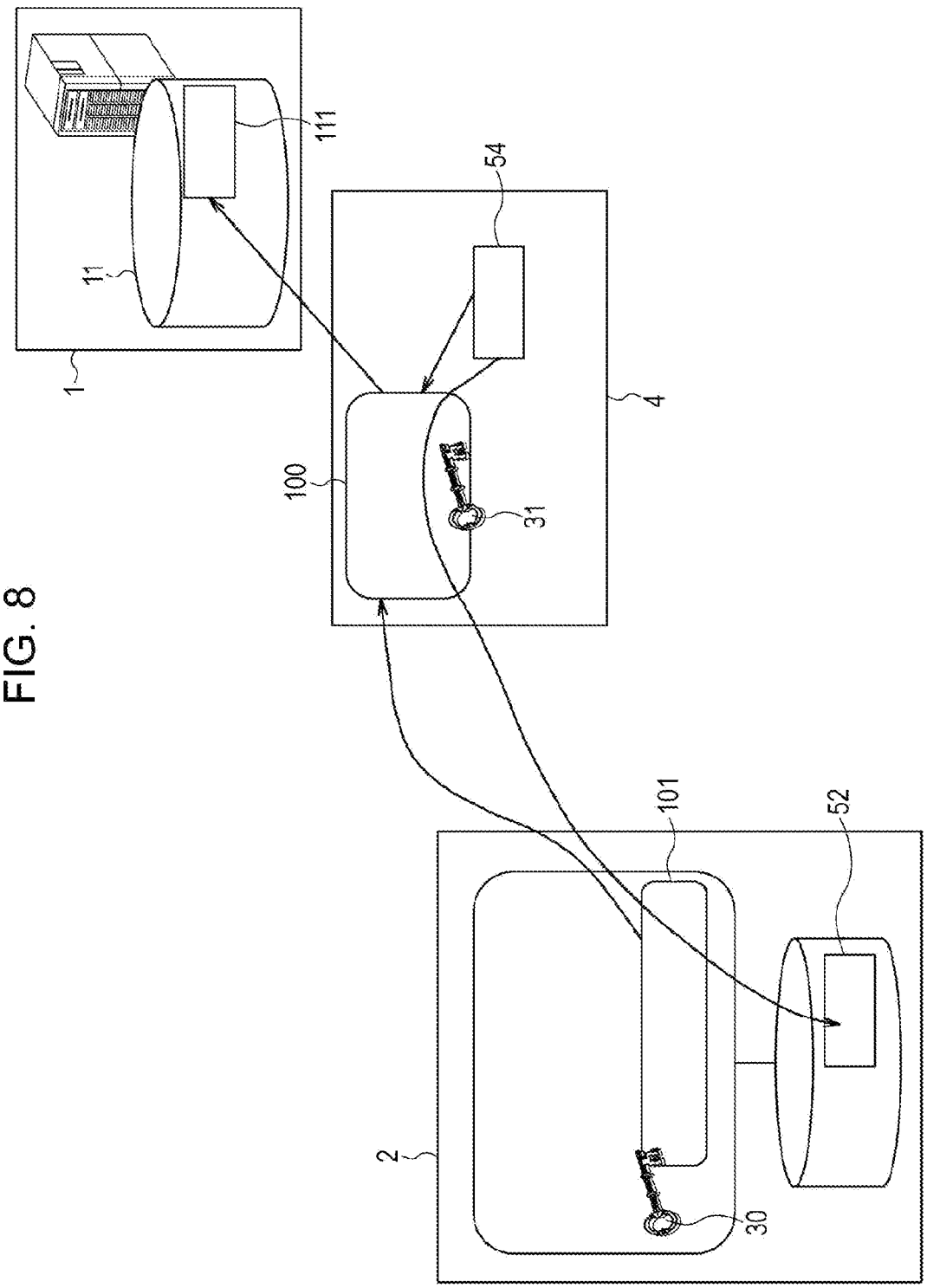
FIG. 8 is a schematic diagram that illustrates a process occurring in check-out requesting in the file updating system according to the embodiment of the present invention.

FIG. 8 is a schematic diagram that illustrates a process occurring in check-out requesting in the file updating system according to the embodiment of the present invention. As illustrated in FIG. 8, when receiving a check-out request from the client 2, the CPU 41 of the mediation server 4 acquires the copied file 54 of the master file 111 from the server 1 and stores it using the running computer program 100.

The CPU 41 generates the public-key information 30 and the private-key information 31 and transmits the public-key information 30 and the copied file to the client 2. The client 2 stores the public-key information 30 and the copied file 52 being the target for updating. The client 2 performs an updating process on the stored copied file.

Referring back to FIG. 7, the CPU 41 of the mediation server 4 generates private-key information and public-key information in association with the stored copied file (step S703) and stores them in the storage device 43 in association with information for use in identifying the copied file, for example, a file name (step S704). The CPU 41 transmits the generated public-key information and the copied file to the client 2, which has transmitted the check-out request (step S705).

The CPU 41 receives the encrypted difference information (step S706) and decrypts the difference information using the stored private-key information (step S707). The CPU 41 applies the decrypted difference information to the stored copied file 54 and updates the copied file 54 to the latest update state (step S708).

The CPU 41 determines whether a check-in request has been received from the client 2 (step S709). When determining that no check-in request has been received (NO in step S709), the CPU 41 returns the process to step S706 and the above-described steps are repeated. When determining that the check-in request has been received (YES in step S709), the CPU 41 duplicates the stored copied file and transmits it as the updated file to the server 1 (step S710) and determines whether notification of the completion of the updating of the master file 111 has been received from the server 1 (step S711).

When determining the notification of the completion has not yet been received (NO in step S711), the CPU 41 waits for the notification of the completion. When determining the notification of the completion has been received (YES in step S711), the CPU 41 transmits the notification of the completion to the client 2 (step S712) and deletes the public-key information, private-key information associated with that public-key information, and the copied file 54 (step S713).

Figure 9:
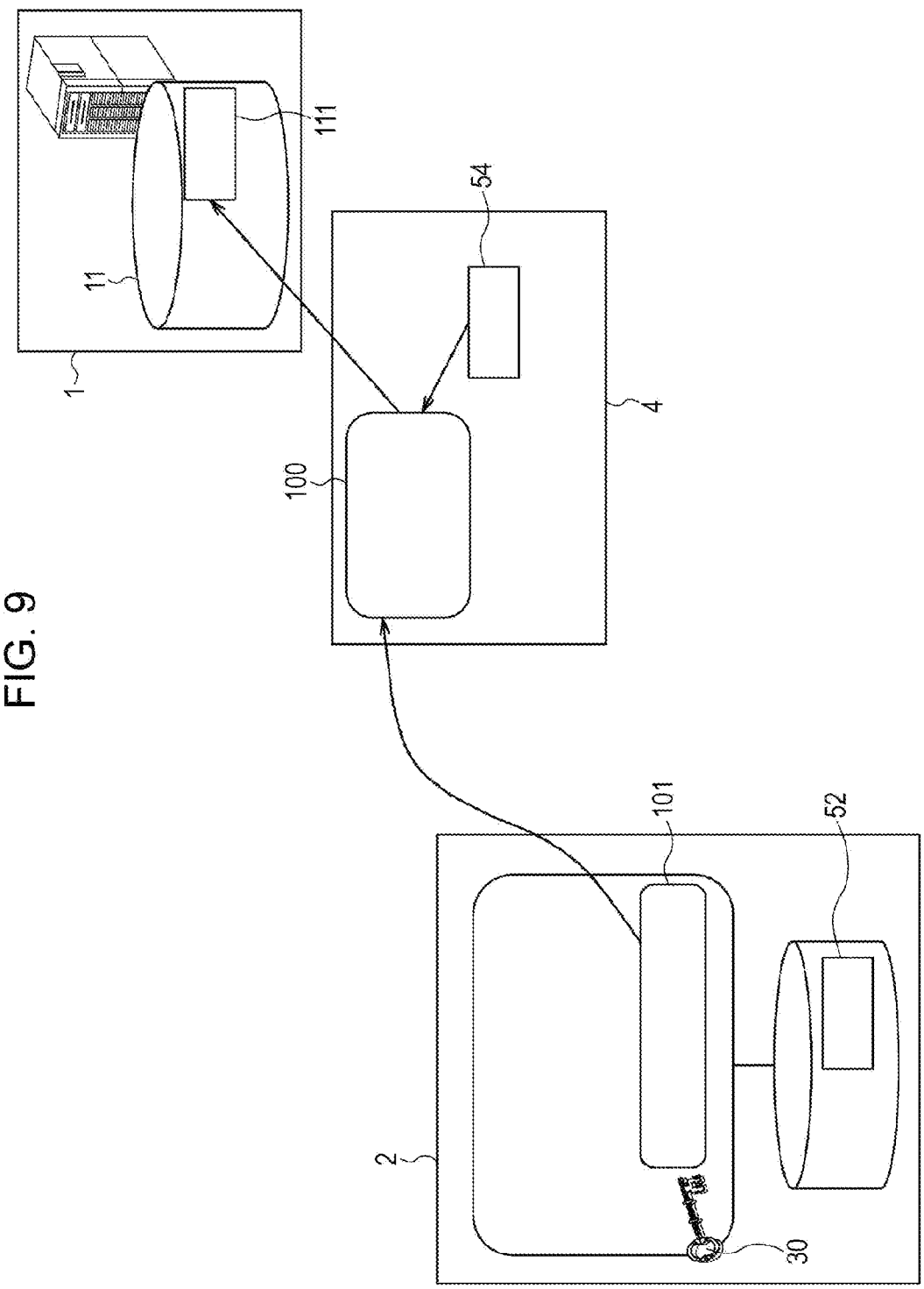
FIG. 9 is a schematic diagram that illustrates a process occurring in check-in requesting in the file updating system according to the embodiment of the present invention.

FIG. 9 is a schematic diagram that illustrates a process occurring in check-in requesting in the file updating system according to the embodiment of the present invention. As illustrated in FIG. 9, when receiving a check-in request from the client 2, the CPU 41 of the mediation server 4 duplicates the stored copied file and transmits it as the updated file to the server 1 using the running computer program 100. This enables the master file 111 to be updated to the latest update state.

The CPU 41 deletes the public-key information 30, the private-key information 31, and the copied file 54. Thus, there are no files updated to the latest state other than the master file 111, and the security of the file can be maintained at a high level. At the time of the requesting check-in, the public-key information 30 and the copied file 52 stored in the client 2 are also deleted.

Figure 10:
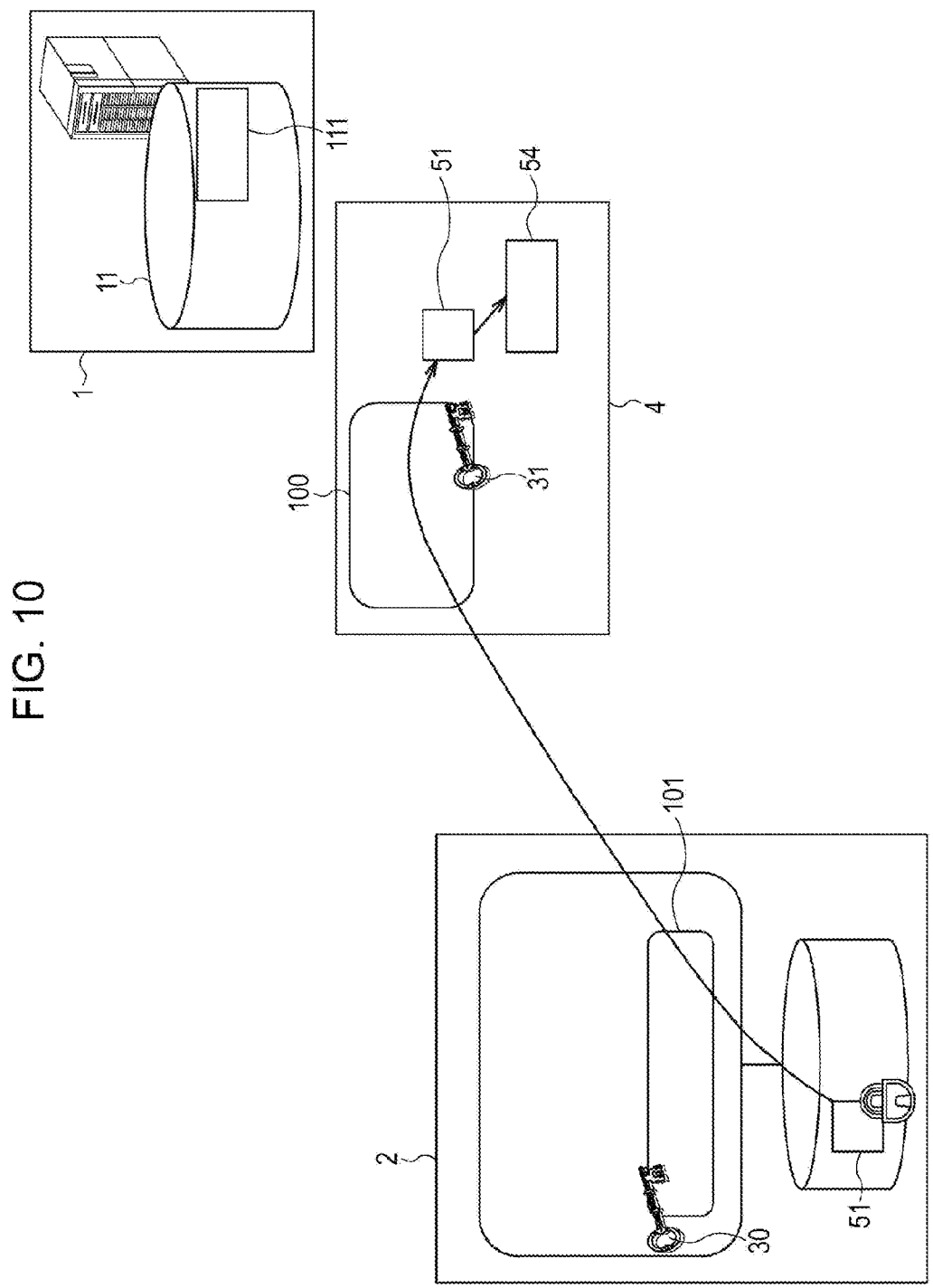
FIG. 10 is a schematic diagram that illustrates a process occurring in recovering a file in the file updating system according to the embodiment of the present invention.

If the stolen client 2 is found or the like, the copied file can be recovered. FIG. 10 is a schematic diagram that illustrates a process occurring in recovering a file in the file updating system according to the embodiment of the present invention.

As illustrated in FIG. 10, only the difference information 51 which is the encrypted n-th time difference is stored in the found client 2. This is because the copied file has already been deleted. When the client 2 is connected again, the CPU 21 of the client 2 transmits the n-th time difference information 51 to the mediation server 4 on condition that the user is authenticated as a legitimate user.

The CPU 41 of the mediation server 4 receiving the n-th time difference information 51 can recover the copied file 54 to the state of updated n times by decrypting the difference information 51 using the private-key information 31 and applying it to the copied file.

According to the present embodiment described above, because an updating process is performed on a copied file stored in the mediation server 4 and encryption-key information for use in encrypting and decrypting the difference information is also generated in the mediation server 4, if the client 2 performing the updating process is missing, stolen, or the like, the master file 111 in the server 1 can be prevented from being directly tampered with or the like. When the condition for being secure is not satisfied, such as when no access to a copied file has been made for a certain length of time or when a certain length of time has elapsed after disconnection from the network, the copied file can be deleted, and the security of the master file containing classified information can be maintained at a high level.

Because difference information is encrypted using public-key information and transmitted to the mediation server 4, if the client 2 is missing or the client 2 is stolen, a copied file to which all the difference information received by the mediation server 4 before the lost or stealing are applied can be restored. If the client 2 is found later, the copied file can be restored to the latest update state by the application of the difference information remaining in the client 2.

The present invention is not limited to the above embodiment, and various changes and improvements can be made within the scope of the present invention. For example, when the mediation server 4 is logically independent from the server 1, they may operate on a physically single computer. When the condition for being secure is not satisfied, the public-key information 30 may be deleted simultaneously with deletion of the copied file 52 updated n times.

REFERENCE SIGNS LIST 1 server
2 client
3 network
4 mediation server
21, 41 CPU
22, 42 memory
23, 43 storage device
24, 44 I/O interface
25, 45 video interface
26, 46 portable disk drive
27, 47 communication interface
28, 48 internal bus
90, 91 portable recording medium
100, 101 computer program

The invention claimed is:

1. A method, executable in a system including a server having a master file stored therein and a mediation server communicatively connected to the server and a client, comprising steps of:
   the mediation server receiving and storing a copied file in which the master file stored in the server is duplicated;
   the mediation server generating private-key information and public-key information associated with the private-key information and transmitting the generated public-key information and the copied file to the client;
   the client receiving and storing the copied file and the public-key information;
   responsive to updating the copied file, the client encrypting difference information on a difference arising in the updating using the public-key information and transmitting the difference information to the mediation server;
   the client determining whether a condition for being secure is satisfied when a process for updating the copied file becomes possible;
   responsive to determining that the condition is not satisfied, the client deleting the copied file;
   the mediation server receiving the difference information from the client;
   the mediation server decrypting the received difference information using the private-key information;
   the mediation server updating the stored copied file using the decrypted difference information;
   responsive to a check-in request for the copied file being accepted, the client deleting the public-key information and the copied file; and
   responsive to the check-in request for the copied file being accepted from the client, the mediation server replacing the master file in the server with the updated stored copied file and deleting the public-key information, the private-key information associated with the public-key information, and the updated stored copied file.

2. The method according to claim 1, wherein the condition is information on a physical location where the client is used.

3. The method according to claim 1, wherein the client further performs steps of:
   measuring a time elapsed since receipt of the public-key information and the copied file from the mediation server; and
   determining whether the condition is satisfied using a time elapsed since a predetermined point in time.

4. A system for updating a file using a copied file in which a master file is duplicated, comprising:
   a server having stored therein the master file; and
   a mediation server communicatively connected to the server and a client;
   wherein the mediation server comprises a memory and a processor configured to:
   acquire and store the copied file in which the master file stored in the server is duplicated, and
   generate private-key information and public-key information associated with the private-key information and transmit the generated public-key information and the copied file to the client;
   wherein the client comprises a memory and a processor configured to:
   receive and store the copied file and the public-key information, responsive to updating the copied file, encrypt difference information on a difference arising in the updating using the public-key information and transmit the difference information to the mediation server,
   determine whether a condition for being secure is satisfied when a process for updating the copied file becomes possible, and
   responsive to determining that the condition is not satisfied, delete the copied file;
   wherein the mediation server is further configured to:
   receive the difference information from the client,
   decrypt the received difference information using the private-key information, and
   update the stored copied file using the decrypted difference information;
   wherein the client is further configured to, responsive to a check-in request for the copied file being accepted, delete the public-key information and the copied file; and
   wherein the mediation server is further configured to, responsive to the check-in request for the copied file being accepted from the client, replace the master file in the server with the updated stored copied file and delete the public-key information, the private-key information associated with the public-key information, and the updated stored copied file.

5. The system according to claim 4, wherein the condition is information on a physical location where the client is used.

6. The system according to claim 4, wherein the client is further configured to:
- measure a time elapsed since receipt of the public-key information and the copied file from the mediation server, and
- determine whether the condition is satisfied using a time elapsed since a predetermined point in time.

* * * * *